Figure 4:
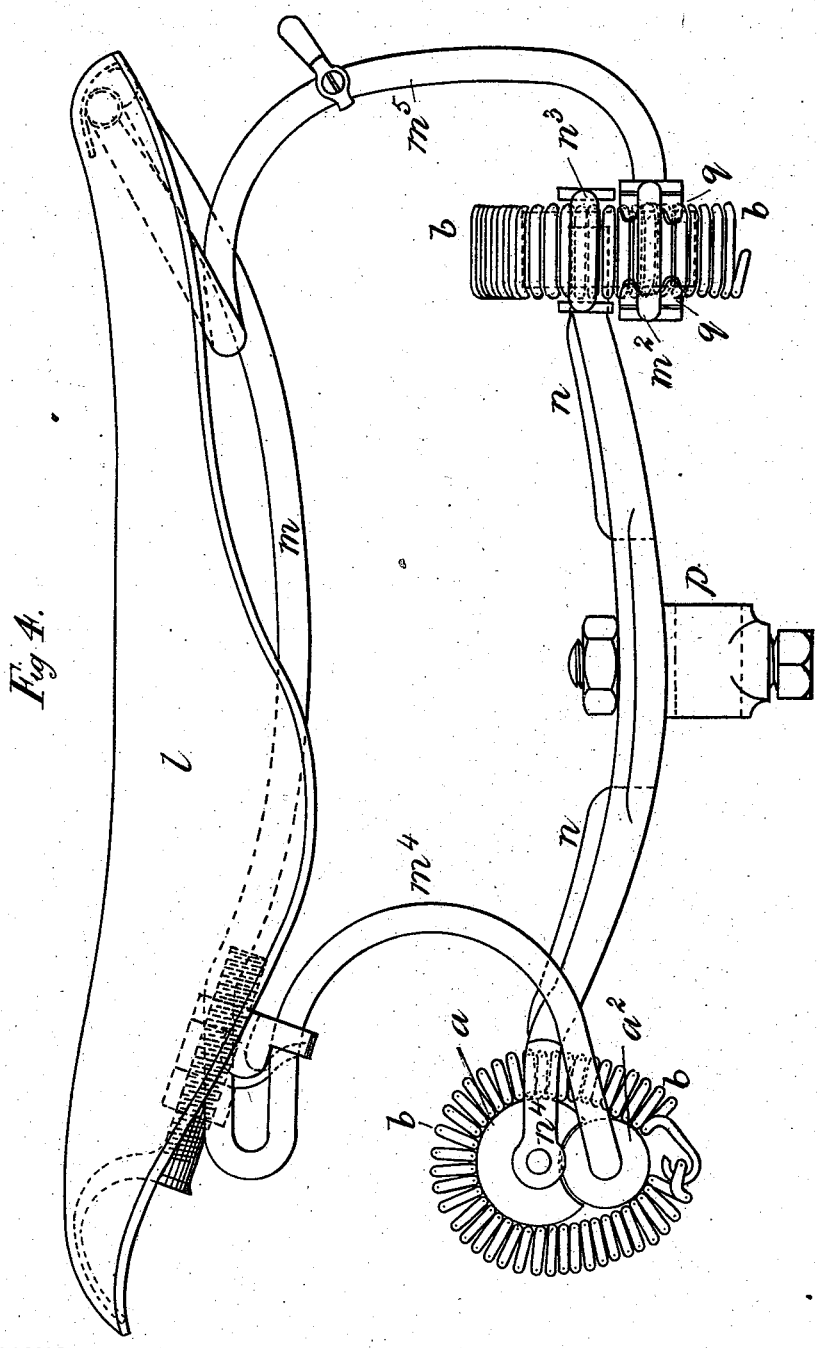

(No Model.) 5 Sheets—Sheet 1.
J. A. LAMPLUGH.
SPRING SHACKLE.
No. 382,534. Patented May 8, 1888.
Fig 1.
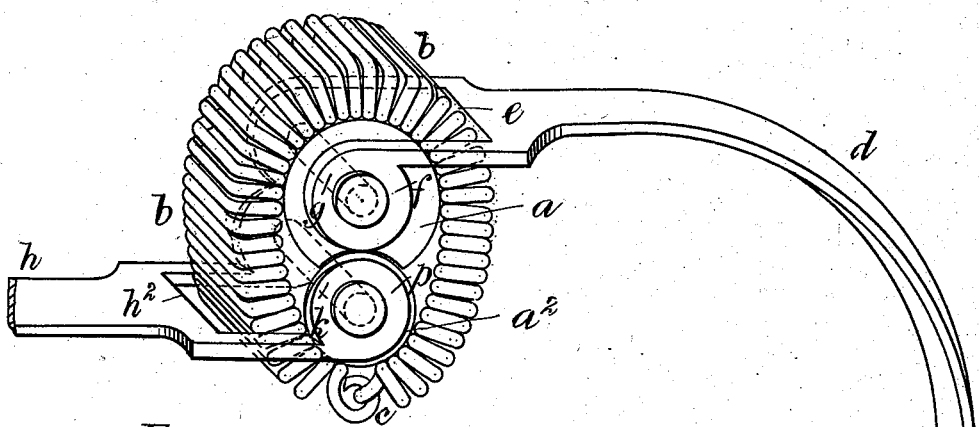
Fig 2.
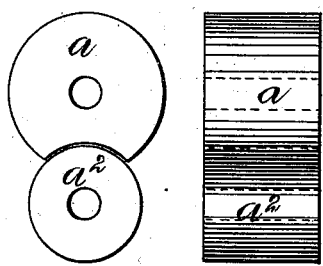
Fig 3.
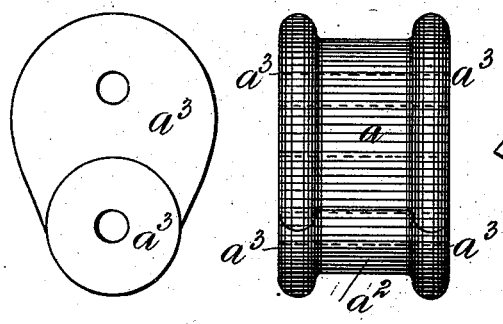
Fig 2<sup>A</sup>
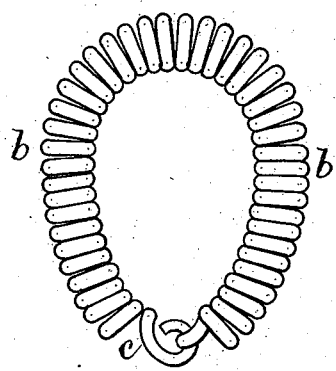
Witnesses:—
George Shaw.
Richard Skerrett.
Inventor:—
James Alfred Lamplugh.

(No Model.) 5 Sheets—Sheet 3.

J. A. LAMPLUGH.
SPRING SHACKLE.

No. 382,534. Patented May 8, 1888.

Witnesses:—
George Shaw.
Richard Skerrett.

Inventor:—
James Alfred Lamplugh.

(No Model.) 5 Sheets—Sheet 4.

J. A. LAMPLUGH.
SPRING SHACKLE.

No. 382,534. Patented May 8, 1888.

Witnesses:—
George Shaw.
Richard Skerrett.

Inventor:—
James Alfred Lamplugh.

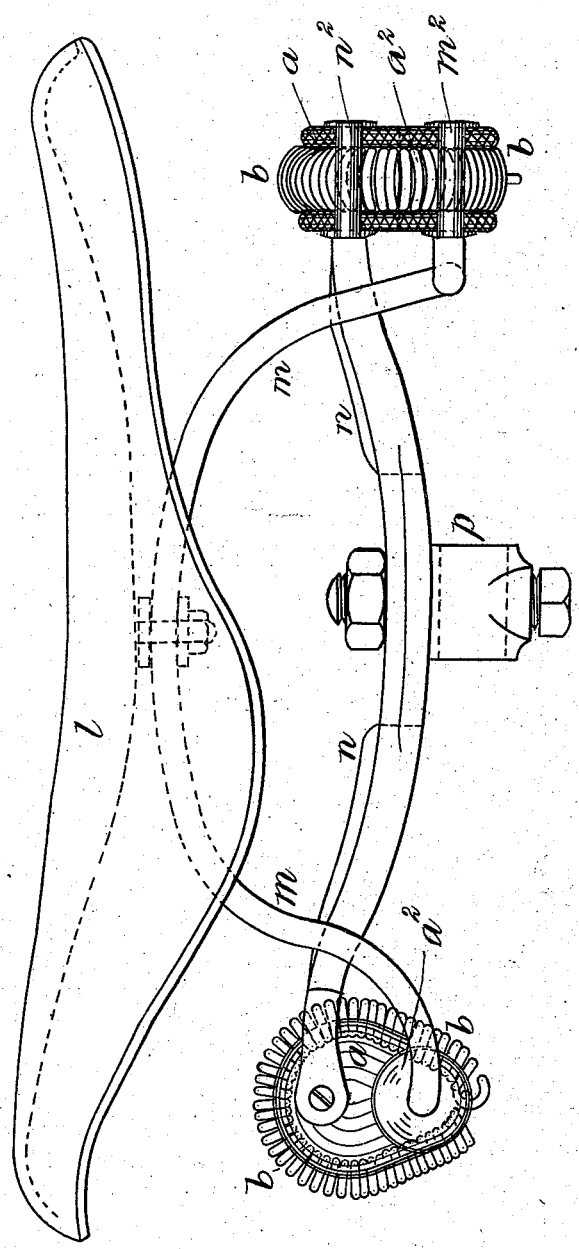

UNITED STATES PATENT OFFICE.

JAMES ALFRED LAMPLUGH, OF BIRMINGHAM, COUNTY OF WARWICK, ENGLAND.

SPRING-SHACKLE.

SPECIFICATION forming part of Letters Patent No. 382,534, dated May 8, 1888.

Application filed January 14, 1888. Serial No. 260,750. (No model.) Patented in England April 27, 1887, No. 6,162.

*To all whom it may concern:*

Be it known that I, JAMES ALFRED LAMPLUGH, of the firm of Thomas Webb Jones & Co., of Birmingham, in the county of Warwick, England, a subject of the Queen of Great Britain, have invented Improvements in Shackles for the Springs of Carriages, and for other purposes, (for which I have made application for Letters Patent in Great Britain, No. 6,162, dated April 27, 1887,) of which the following is a specification.

The shackles of semi-elliptical grasshopper and other like carriage-springs, by which the said springs are connected to carriages, ordinarily consist of an elliptical iron band or hoop, the interior of which is filled by an elliptical block of vulcanized india-rubber, in which india-rubber holes are made, into which the ends of the parts to be connected together are inserted. The elasticity of the india-rubber is limited by the elliptical iron band surrounding it, and the shackle deadens vibrations very imperfectly.

In making a shackle according to my invention I employ in place of the rigid elliptical iron band or hoop ordinarily employed an elastic band or hoop made of a flattened coil of hardened and tempered steel wire, the ends of the coils being connected together. I prefer to make the block of vulcanized india-rubber, with flanges at its ends, so that the elastic elliptical band or hoop seats itself between the said flanges. As the said elastic hoop yields to the pressure to which the india-rubber is subjected, the shackle has much greater elasticity than shackles as ordinarily constructed.

Where a great range of elasticity in the shackle is desired, I divide the block of india-rubber in a plane crossing the direction in which the greatest elasticity is required. In this case the two parts of the india-rubber block separate under great pressure, their separation being controlled and limited by the elastic band or hoop. Owing to the great elasticity of shackles made according to my invention, they deaden vibration to an extent unattainable in shackles of the ordinary construction.

Besides being applicable to carriage-springs, shackles made according to my invention are applicable for various purposes where an elastic support is required. For example, they may be employed for supporting the seats of velocipedes, the seat being connected at its ends by means of vertical rods with the lower part of the india-rubber block of the shackle, other rods fixed to the body or backbone of the velocipede being connected with the upper part of the india-rubber block.

Similarly shackles made according to my invention may be employed generally where it is desired to effect an elastic connection between two articles or things.

I will now proceed to describe, with reference to the accompanying drawings, the manner in which my invention is to be performed.

Figure 1 represents in perspective a shackle, constructed according to my invention, applied to one end of a semi-elliptical carriage-spring, the india-rubber block of the shackle being made in two parts. Fig. 2 represents the india-rubber block of the shackle detached. Fig. 2$^A$ represents in side elevation the metallic elastic hoop or band detached. Fig. 3 represents the india-rubber block having flanges. Figs. 4, 5, 6, and 7 represent shackles, constructed according to my invention, applied to the frames of velocipede-saddles.

I will first describe the carriage-spring shackle, Figs. 1, 2, and 2$^A$.

The shackle consists of the india-rubber block $a\, a^2$, made in two parts, (the smaller part, $a^2$, partly fitting in a concavity in the lower portion of the larger part, $a$,) and the elastic metallic hoop or band $b$ encircling the said india-rubber block $a\, a^2$, and pressing and preserving the two parts of the said block together. The said elastic hoop or band $b$ permits of the separation of the two parts of the block under pressure as well as limits their separation. The said elastic hoop or band $b$ is made of a flattened coil of hardened and tempered steel wire, the ends of the flattened coil being hooked together at $c$, or otherwise connected together.

The flattened elastic coil, to form the elastic hoop or band $b$ of the shackle, is coiled or bent from a length of steel wire in the ordinary way of coiling wire for other purposes. $d$ is the end of the semi-elliptical carriage-spring, having a fork, $e$, between the branches of which the larger part, $a$, of the india-rubber block and the elastic hoop or band $b$ are situated. The said fork $e$ has side eyes at $f$, and the block $a$ is connected to the forked end of the spring by the cross bolt or pin $g$, passed through the middle of the said block $a$ and through the eyes at $f$. $h$ is the flat rod fixed to the carriage-frame, to which the shackle is connected. The said rod $h$ has a fork, $h^2$, and eyes at $p$.

In the fork $h^2$ the smaller part, $a^2$, of the shackle-block and the elastic hoop or band $b$ are situated, and the said smaller part, $a^2$, of the block is connected to the flat bar $h$ on the carriage-frame by passing the bolt or pin $k$ through the axis of the block $a^2$ and through the eyes $p$ of the fork $h^2$. The two parts $a$ $a^2$ of the india-rubber block of the shackle may be molded in strips or lengths having the sectional figures represented, and are consequently without flanges at their ends, the elastic metallic hoop or band $b$ of the shackle being preserved in its place on the block, and lateral motion in it prevented by the forks $e$ $h^2$ in the ends of the semi-elliptical spring $d$ and fixed bar $h$; but the two parts of the india-rubber block may be provided with flanges at their ends for the elastic band or hoop to seat itself between. An india-rubber block having flanges is represented in Fig. 3, where the flanges are marked $a^3$ $a^3$.

In place of making the india-rubber block either plain or flanged of two pieces, the block may be made solid or in one piece, having the sectional figure of the two combined parts $a$ $a^2$ or $a$ $a^2$ $a^3$, or other desired figure, when a limited amount of elasticity is required in the shackle.

Figure 5:
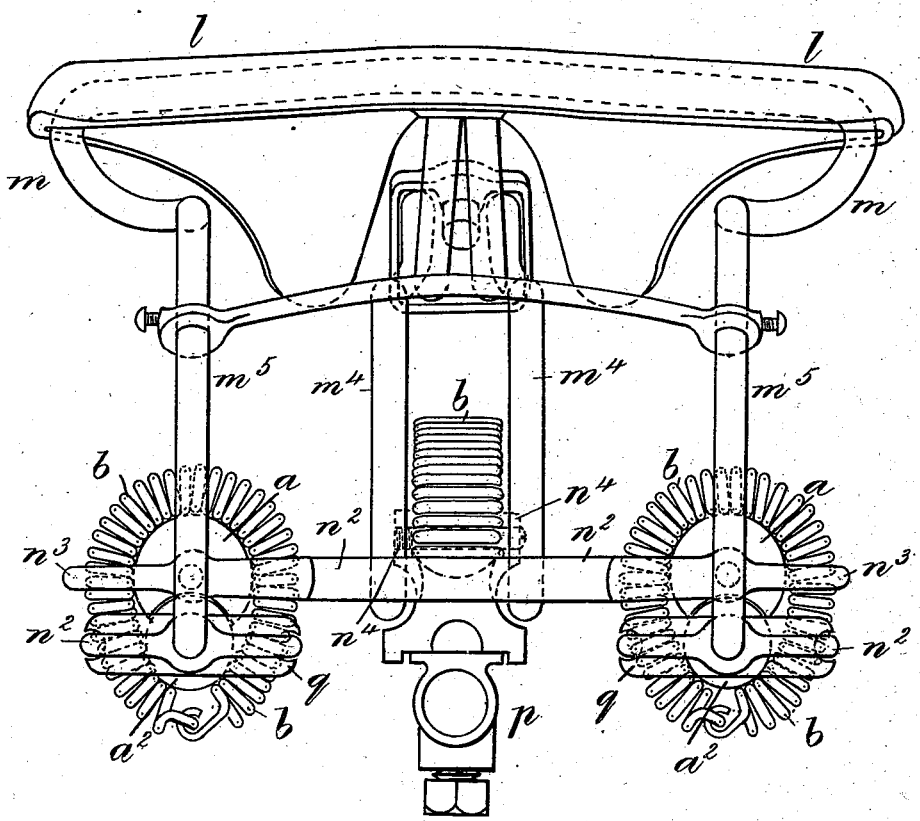
Figure 6:
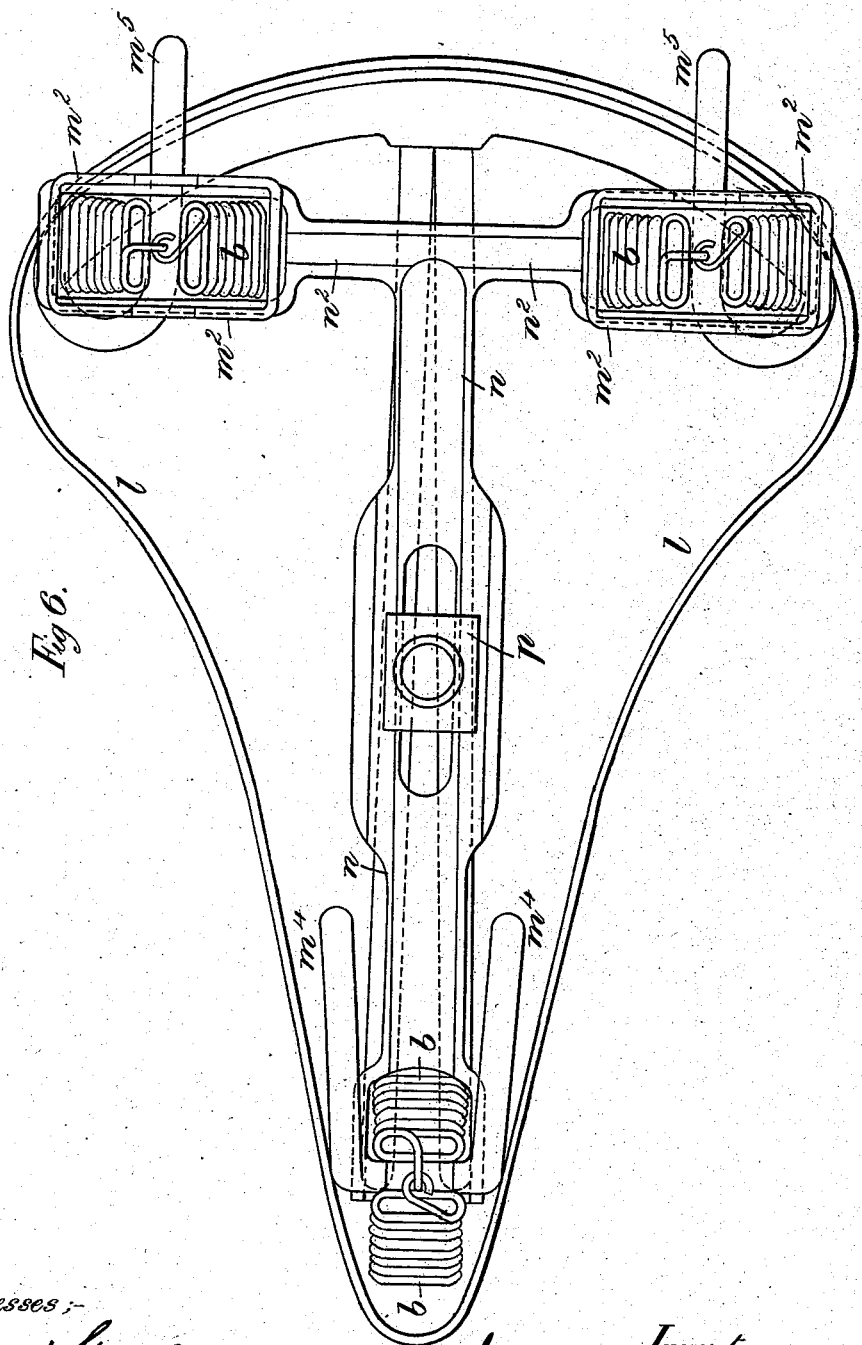

Fig. 4 represents in side elevation, Fig. 5 in end elevation, and Fig. 6 in plan of under side, my improved shackles applied to the suspending and supporting frames of a tricycle-saddle, the saddle being provided with three shackles—one at the front and two at the back of the saddle-frames. In the said Figs. 4, 5, and 6 the india-rubber blocks of the shackles are marked $a$ $a^2$ and the metallic elastic hoops or bands encircling them are marked $b$ $b$.

$l$ is the leather seat of the saddle, connected by its ends to the suspending-frame or rods—$m^4$ $m^5$. The bottoms of the back rods, $m^5$ $m^5$, of the suspending-frame carry loops $m^2$ $m^2$, and the front rod, $m^4$, embraces and passes through the lower block, $a^2$. The ends of the said rods $m^5$ $m^5$ form pins crossing the said loops and fork, and are passed through holes in the smaller parts, $a^2$ $a^2$, of the india-rubber blocks, as described with respect to the bolts or pins of the carriage-spring shackle, the said rods being fixed to the said blocks either by riveting their ends or by screw-nuts.

$n$ $n^2$ is a T-shaped supporting-frame secured by the connection at $p$ to the frame of the tricycle. The said supporting-frame has at back a cross-bar, $n^2$, each end of which carries a rectangular loop, $n^3$, and the front of the part $n$ of the frame is forked at $n^4$. Pins cross the said loops $n^3$ $n^3$ and join the branches of the said fork $n^4$, the said pins passing through and supporting the larger parts, $a$ $a$, of the india-rubber blocks. The larger parts, $a$ $a$, of the said blocks are thus connected to the loops $n^3$ $n^3$ and fork $n^4$ on the T-shaped supporting-frame $n$ $n^2$, and the smaller parts, $a^2$ $a^2$, of the said blocks are connected to the loops $m^2$ $m^2$ and forked rod $m^4$ of the suspending-frame, two parts of each block being pressed together by the metallic elastic hoop or band $b$ around them, as before described.

The loops $m^2$ $m^2$ at the bottoms of the rods $m^5$ $m^5$ of the suspending-frame are provided with leather or other packing pieces $q$ $q$ for the elastic hoops or bands $b$ $b$ to bear against and prevent friction of the metallic elastic hoop or band against the loops $m^2$ $m^2$.

When a rider seats himself upon the saddle, the smaller parts, $a^2$ $a^2$, of the several shackle-blocks supported by the suspending-frame separate from the larger blocks, $a$ $a$, supported by the fixed frame, and the elastic hoops or bands $b$ $b$, surrounding the said shackle-blocks, are put into a state of tension. A very elastic saddle is thus produced by the use of my improved shackles, the said shackles at the same time deadening or nearly deadening vibrations in the saddle.

The india-rubber blocks of the shackles of this tricycle-saddle may be provided with flanges for retaining the elastic hoops or bands in their places, and where a small range of elasticity only is required in the saddle solid india-rubber blocks may be used instead of blocks made in two pieces.

Fig. 7 represents in side elevation another saddle provided with shackles constructed according to my invention. This saddle resembles that last described excepting that the suspending-frame $m$ is arch-shaped and the saddle $l$ is connected to it at its middle. The T-shaped under frame, $n$, and the shackles are constructed as described with respect to the last-mentioned saddle, excepting that the india-rubber blocks of the shackles are provided with flanges for retaining the elastic hoops or bands in their places.

The arrangements of the shackles of the saddles of Figs. 4, 5, 6, and 7 are suitable for tricycles and safety-bicycles of the Rover type, and by changing the shape of the frame and using the required number of shackles they may be applied to saddles for all kinds of velocipedes.

When the blocks of the shackles are made in two pieces, the said blocks, instead of being made of vulcanized india-rubber, may be made of other materials—such, for example, as leather or wood.

Although I have only represented my improved shackles in connection with a semi-elliptical carriage-spring and with the suspending and supporting frames of saddles for velocipedes, yet my invention, as before stated, may be applied generally where an elastic connection is required between two parts of an article—such, for example, as suspending the seats of chairs and the mattresses of bedsteads.

Having now particularly described and ascertained the nature of my invention, and the manner in which the same is to be performed, I declare that I claim as my invention—

1. A shackle composed of a core of elastic material peripherally surrounded by an elastic band or hook consisting of a flattened coil of spring-wire united at its ends, substantially as described.

2. A shackle composed of an inner elastic core consisting of two cylindrical blocks of elastic material and a surrounding elastic band of flattened coiled spring-wire, substantially as described.

3. A shackle composed of an inner elastic core consisting of two cylindrical blocks of elastic material, one of which is provided with a longitudinal groove, as shown and described, and a surrounding elastic band of flattened coiled spring-wire, substantially as set forth.

4. A shackle composed of an inner core consisting of two cylindrical blocks of elastic material, $a\ a^2$, having end flanges, $a^3$, and a surrounding band of flattened coiled spring-wire, substantially as described.

5. The combination, with the elastic blocks $a\ a^2$, and the hoop or band $b$, composed of flattened coiled spring-wire united at its ends, of the forked spring $d$ and forked rod $h$, connected, respectively, with blocks $a\ a^2$ by means of bolts $g\ k$, substantially as described.

JAMES ALFRED LAMPLUGH. [L. S.]

Witnesses:
GEORGE SHAW,
RICHARD SKERRETT.